Nov. 26, 1957     J. W. GRAY     2,814,767
CYCLIC FUNCTION MODIFYING CIRCUIT
Original Filed Dec. 31, 1952
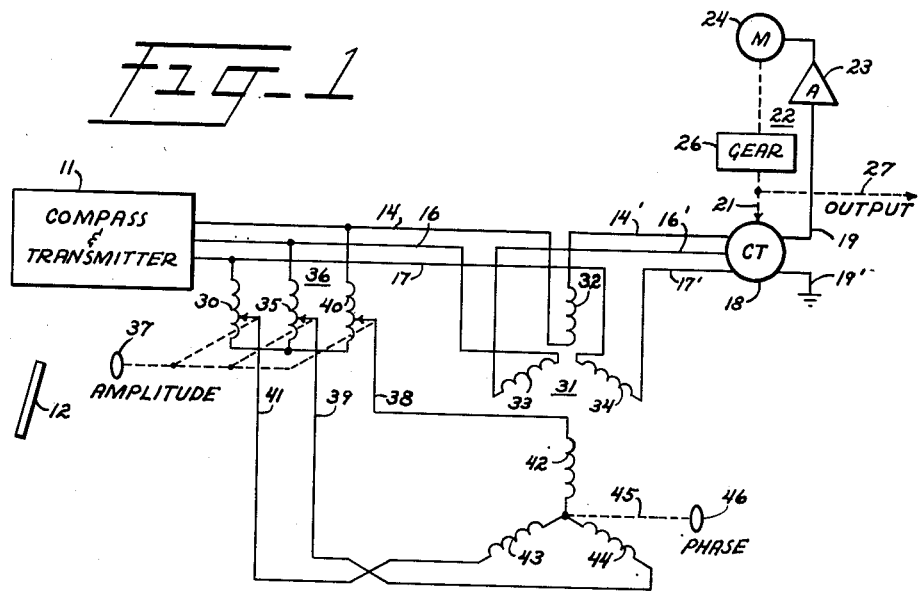
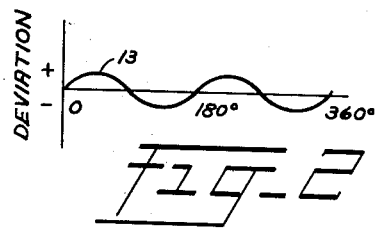
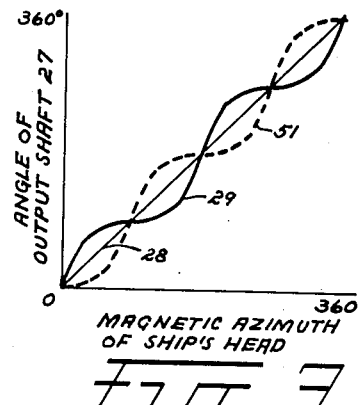
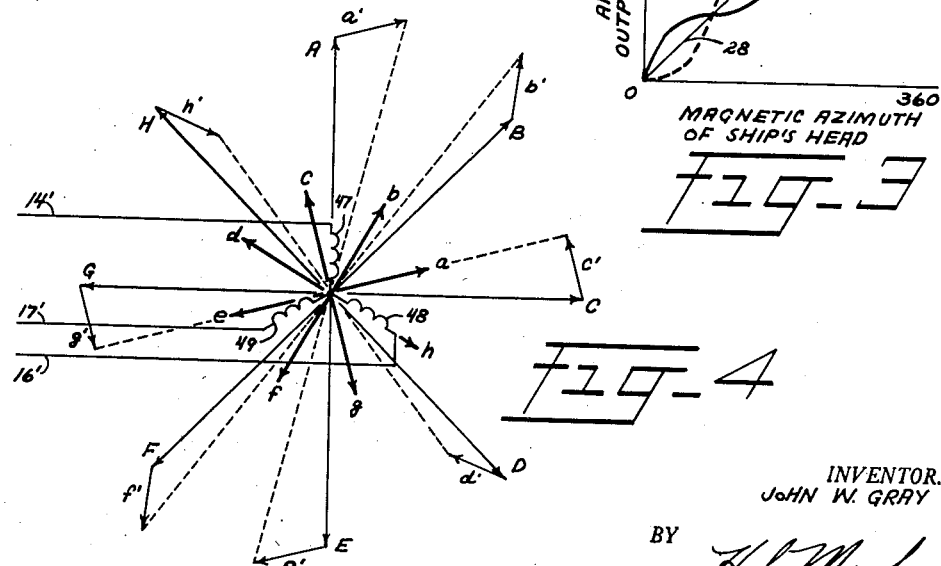
INVENTOR.
JOHN W. GRAY
BY
ATTORNEY

United States Patent Office 2,814,767
Patented Nov. 26, 1957

2,814,767
CYCLIC FUNCTION MODIFYING CIRCUIT

John W. Gray, Pleasantville, N. Y., assignor to General Precision Laboratory Incorporated, a corporation of New York Original application December 31, 1952, Serial No. 329,044, now Patent No. 2,753,498, dated July 3, 1956. Divided and this application June 18, 1956, Serial No. 591,946

12 Claims.  (Cl. 318—24)

This application is a division of copending application, Serial No. 329,044, filed December 31, 1952, now Patent No. 2,753,498, issued July 3, 1956, of the same inventor.

The present invention relates to an arrangement for correcting for magnetic compass deviation error and more specifically for correcting for the double frequency portion of such deviation error.

In the use of a magnetic compass on a vehicle, vessel or craft of any kind, deviation is defined as the departure of the compass indication from the magnetic meridian due to the presence of magnetic material on the vehicle. If the magnetic material has low retentivity its magnetism is only that induced by the earth's field and its polarity is dependent upon the heading or attitude of the vehicle. The presence of such a mass in the vicinity of the compass produces an error in the compass data which varies through two complete and nearly similar cycles as the vehicle's heading is swung through 360° of azimuth angle. In this sense the soft iron or other low retentivity magnetic mass produces a double frequency compass error. It is this double frequency error, known as the "quadrantal deviation," which is neutralized by means of the apparatus of this invention, by introducing data of equal intensity and opposite phase to the electrical compass data transmission system.

Broadly considered, this invention is not only useful as a means of correcting such compass deviation error, but provides means for inserting a multiple frequency component in any cyclic function.

In general the instant invention incorporates a synchro data transmission system, consisting of a synchro transmitter, synchro repeater and differential or control synchro or equivalent, in association with a variable transformer arrangement which introduces into the data transmission system a signal whose frequency is a multiple of the fundamental frequency of the cyclic input applied to the synchro transmitter. Provisions are made for adjustment of both the magnitude and phase of the multiple frequency component relative to the primary frequency component.

In applying this invention to the neutralization of the double frequency portion of the deviation error of a magnetic compass, the angular displacement input data are taken from the compass by means of any conventional type of take-off which provides data output of the rotating phase or synchro type, and after inserting the correction the output data are converted to mechanical shaft displacement by the use of a control synchro and with the aid of a position servomechanism.

The components instrumenting this invention consist only of passive elements which are fixed except for the two adjustable elements, and these remain fixed after their adjustments have been made. The components as a group have only six terminals: three input synchro lines and three output synchro lines. The instrument is particularly useful because the accuracy of its angular output is completely unaffected by variations of level of excitation. This is an important virtue because the intensity of the earth's horizontal field component varies at different magnetic latitudes by a factor of ten.

The general purpose of this invention, therefore, is to generate and introduce a multiple frequency component into an electrical data transmission system carrying fundamental frequency data so that the system output delivers data consisting of the amplitude sum of the fundamental and multiple frequency components.

One particular purpose of this invention is, in an electrical data transmission system carrying magnetic compass data having a fundamental frequency component and a component having double the fundamental frequency, to generate and introduce a double frequency component having the same magnitude but of opposite phase to that of the data double frequency components, thus neutralizing the double frequency component and leaving only the fundamental frequency component in the output.

A further understanding of this invention may be secured from the detailed description and drawings, in which:

Figure 1 is a circuit diagram of an embodiment of the invention.

Figures 2 and 3 are graphs of voltage output.

Figure 4 is a vector diagram illustrating the operation of the invention.

Referring now to Fig. 1, a magnetic compass of any type combined with a suitable take-off device and synchro data transmitter is indicated at 11. The compass is assumed to be mounted in a vehicle such as, for example, a marine vessel or an aircraft, and the bar 12 positioned near the compass 11 represents diagrammatically the proximity of any magnetic mass, such as, for example, the steel hull of the marine vessel in which the compass is installed. The compass error or deviation caused by such a magnetic mass is depicted in Fig. 2, in which the abscissae represent the magnetic azimuth angle through which the ship's head moves as the ship is swung from north clockwise through a full circle of 360° and back to north. The ordinates indicate the deviation of the compass azimuth indication from the true azimuth. The deviation thus caused by a soft iron mass is ideally represented by the sine curve 13 which executes two full cycles in the abscissa distance of 360°. This deviation may be loosely termed a "double frequency" deviation, in the sense that it executes two cycles during a single cycle of azimuth movement of the ship's head.

The compass output is applied through the synchro transmitter, which is of the three phase type, and the conductors 14, 16 and 17 to a control transformer or control synchro 18. This device has the characteristic that in the absence of any correcting signal such as is later described, the output at conductors 19 and 19' is at zero potential when the shaft 21 is at the same angle relative to its stator as the transmitter shaft is relative to its stator. When, however, the two rotors differ in angular position, the alternating voltage output between conductors 19 and 19' represents that angular difference by its magnitude and the sense by its phase. A conventional position servomechanism 22 comprising amplifier 23, motor 24, gear 26 and output shaft 27 is connected to the control transformer electrical output 19 and to its shaft 21, whereby the shaft is kept at all times at the same angle as that of the transmitter. The output shaft 27 therefore has the same angular displacement at any instant as that of the transmitter and of the compass needle.

This output shaft angle is plotted in Fig. 3 against magnetic azimuth angle of the ship's head as it is swung, in order to show the effect of the double frequency error. The straight line 28 represents output shaft angle variation as it would be in the absence of deviation error, and 29 represents the shaft angle variation when the compass is affected by the presence of a magnetic mass producing the double frequency deviation error. This error is of course the vertical distance between the two lines at any azimuth angle as explicitly plotted in Fig. 2.

As thus far described the presence of the differential synchro 31, constituting a portion of the arrangement for correcting for the double frequency deviation error has been ignored. The differential synchro 31 comprises a three-phase stator consisting of windings 32, 33 and 34 spaced 120 electrical degrees as respects each other, and a three-phase rotor consisting of windings 42, 43 and 44 likewise disposed 120 electrical degrees as respects each other, and angularly positioned by the knob 46 and shaft 45. Each of the stator windings 32, 33 and 34 is connected in series in a respective conductor 14, 16 and 17. An auto transformer 36 having windings 30, 35 and 40 is connected across the conductors 14, 16 and 17 and has a high impedance so as not to overload the compass synchro transmitter 11. Each of the windings 30, 35 and 40 is provided with a variable tap connected for conjoint adjustment by the knob 37 and electrically connected to the rotor windings 42, 43 and 44 by means of conductors 38, 39 and 41.

In the absence of any appreciable magnetic field in synchro 31 the stator windings 32, 33 and 34 have no effect upon the angular output of the control transformer 18, and merely add a negligible impedance in series with the conductors 14, 16 and 17. However, when a magnetic field is produced in synchro 31 by current flowing in the rotor windings 42, 43 and 44, and the stator circuits are closed, alternating potentials are induced in these windings as follows. Let it be supposed, as the ship's head is swung, causing the compass card to rotate 360° relative to its lubber line, that the progression of the phases of the voltages in the lines 14, 17 and 16 applied to the windings 32, 34 and 33 rotates clockwise as viewed in Fig. 1. At the same time, because of the reversal of rotor conductors 39 and 41, the direction of rotation of the rotor field of differential synchro 31 is counterclockwise and induces a counterclockwise component in the stator, causing corresponding currents to be induced in the coils 32, 33 and 34, progressing counterclockwise from coil to coil. This produces corresponding voltages between the conductors 14', 16' and 17' and in the input coils of the control transformer 18, resulting in two cycles of potential variation in the output thereof during one cycle of swing of the ship's head, in addition to the normal output heretofore described. By appropriate adjustment of the phase of this potential variation by knob 46 and of its magnitude by knob 37, this double frequency potential variation may be made to be exactly equal and opposite to the double frequency deviation error, thus neutralizing it and producing an output at the shaft 27 which is represented by the straight line 28, Fig. 3.

The manner in which this action is accomplished is perhaps more clearly seen in terms of the addition of oppositely rotating vectors. In Fig. 4 the input coils of the control transformer 18 are indicated at 47, 48 and 49, fed by conductors 14', 16' and 17'. The coils are spatially separated by 120° electrical intervals, so that as they receive varying excitation, with the maximum passing from one to the other in turn, the composite field of the three coils has an average direction that varies in step with the change in input data received through the conductors 14', 16' and 17'. Thus at one time the maximum field direction is in the direction of the large arrow A, later it is in the direction of arrow B, then arrow C, and so on through the directions D, E, F, G and H until the field maximum has rotated a complete revolution clockwise around the circle and back to direction A. Let it be assumed that the input data causing this progression are received from the compass 11, Fig. 1, and that for the purpose of this explanation these input data contain no deviation error.

At the same time additional input data are received from the differential synchro 31. These data consist of voltages superimposed upon the voltages already imposed on the conductors 14', 16' and 17' and applied to the coils 47, 48 and 49 and are in addition to these other voltages applied thereto. These new voltages also produce at any instant a composite maximum field in a single direction. Let it be supposed, at the instant when the compass field maximum is in the direction A, that the differential synchro field maximum is in the direction $a$, and furthermore that the latter field maxium value is much smaller than that of the former field. This fact is indicated by the shorter length of the arrow $a$ as compared to the arrow A. Thus these arrows have both magnitude and direction, representing the magnitudes and directions of the fields at a selected instant and therefore the fields are described as vector quantities and the arrows constitute vector representations of the fields. In the next instance, when the compass-generated field is at B, the differential synchro generated field is at $b$, displaced in a counterclockwise direction from $a$. This direction of rotation follows from the reversal of the conductors 39 and 41 feeding the differential synchro rotor. Thus while the compass-generated field rotates clockwise from A through one revolution, the differential synchro generated field rotates counterclockwise from $a$ through one revolution, and the rotation of either field relative to the other field is not one but two revolutions.

This is easily demonstrated by adding vectors $a$ and A, $b$ and B, etc., and plotting the angular differences between the sums and the ship's heading angles. This is done graphically by replotting vector $a$ as parallel vector $a'$ from the tip of vector A, and drawing a dashed line from the tip of $a'$ to the center, and similarly with the other vectors. The vector sums represented by the dashed lines represent, by their angular divergencies from the compass vectors A, B, etc., the corrections introduced by the differential synchro. These corrections change signs several times around the circumference so that, when these corrections are plotted against the angles of A, B, etc., a curve similar to that of Fig. 2 results. If the angles of the dashed lines be plotted against the angles of the vectors A, B, etc., a wavy curve similar to that of 29, Fig. 3, is the result.

If now the compass-generated input to the control transformer 18, Fig. 1, has the wavy characteristic represented by 29, Fig. 3, and by means of the differential synchro 31, Fig. 1, controlled by the amplitude adjustment 37 and the phase adjustment 46, and the method described, a similar wavy line correction is introduced having the same amplitude as the compass-generated second-harmonic error but with exactly the opposite phase, as represented by the dashed line 51, Fig. 3, then obviously the correction neutralizes the error, leaving the straight line characteristic curve 28. In other words, the double frequency compass deviation has been corrected by simple electrical means including the differential synchro 31 and the transformer 36.

What is claimed is:

1. A cyclic function modifying circuit comprising, means for generating a cyclically varying input signal representative of said cyclic function, a synchro control transformer having said signal imposed thereon, a position servo loop including said control transformer for positioning a mechanical member, synchro means energized by said input signal and producing therefrom an output signal which cyclically varies as a function of the cyclic variation of said input signal, means for adjustably determining the amplitude of said output signal, and means for modifying the position of said mechanical member in accordance with the adjustably determined amplitude cyclic variation of said output signal.

2. A magnetic deviation correction generator comprising, a synchro transmitter positioned in accordance with magnetic compass data, a synchro control transformer electrically excited in a selected phase sequence by the output of said synchro transmitter, position servomechanism means electrically actuated by said synchro control transformer for converting the output thereof to a mechanical deflection, a synchro electrically energized by the output of said synchro transmitter in a phase sequence opposite to said selected phase sequence, and means for utilizing the output of said synchro to modify the operation of said position servo.

3. A cyclic function modifying circuit comprising, a synchro transmitter generating a cyclically varying signal representative of a mechanical displacement applied to the input thereof, a synchro control transformer having said signal impressed thereon in selected phase sequence, a servo loop including said control transformer for positioning a mechanical member, a synchro energized by said cyclically varying signal, and means for impressing the output of said last mentioned synchro on said synchro control transformer in a phase sequence opposite to said selected phase sequence.

4. A cyclic function modifying circuit comprising, a synchro transmitter generating a cyclically varying signal representative of a mechanical displacement applied to the input thereof, a synchro receiving device having said signal impressed thereon in selected phase sequence, a servo loop including said control transformer for positioning a mechanical member, a differential synchro, means for adjustably energizing said differential synchro with a selected portion of said cyclically varying signal, and means for impressing the output of said differential synchro on said synchro receiving device in phase sequence opposite to said selected phase sequence.

5. A cyclic function modifying circuit comprising, a synchro transmitter generating a cyclically varying signal representative of a mechanical displacement applied to the input thereof, a synchro receiving device, a circuit interconnecting the output of said synchro transmitter and the input of said synchro receiving device, a differential synchro including primary and secondary windings, and means for imposing a selected portion of said cyclically varying signal in reversed phase sequence on said primary windings, the secondary windings being connected in series in said circuit interconnecting said synchro transmitter and said synchro receiving device.

6. A cyclic function modifying circuit comprising, a synchro transmitter generating a cyclically varying signal representative of a mechanical displacement applied to the input thereof, a synchro device, a differential synchro including primary and secondary windings, a circuit having said secondary windings connected in series therein interconnecting the output of said synchro transmitter and the input of said synchro device, and adjustable step-down transformer means interconnecting the output of said synchro transmitter and the primary windings of said differential synchro.

7. A cyclic function modifying circuit comprising, means for generating a cyclically varying input signal representative of said cyclic function, a synchro device receiving said input signal and having a mechanical output, synchro means energized by said input signal and producing therefrom an output signal which has twice the frequency of said cyclically varying input signal, and means for modifying said mechanical output in accordance with said output signal.

8. A magnetic deviation correction generator comprising, a synchro transmitter positioned in accordance with magnetic compass data, a first synchro device receiving the output of said synchro transmitter in a selected phase sequence having a mechanical output, a second synchro device electrically energized by the output of said synchro transmitter in a phase sequence opposite to said selected phase sequence to generate a correction signal having twice the frequency of the output of said synchro transmitter, and means for utilizing the output of said second synchro to modify the positioning of said mechanical output.

9. A cyclic function modifying circuit comprising, a synchro transmitter generating an electrical signal varying through one cycle during one complete rotation of the shaft thereof, said electrical signal having a space phase representative of mechanical displacement applied to said shaft, a synchro device having said electrical signal impressed thereon in a selected phase sequence and having a shaft angular displacement output, a differential synchro, means for adjustably energizing said differential synchro with a reduced amplitude of said electrical signal to produce a correction signal varying through two cycles during one complete rotation of said synchro transmitter shaft, and means for impressing said correction signal on said synchro device.

10. A cyclic function modifying circuit in accordance with claim 9 in which said differential synchro output correction signal has the same wave form as said synchro transmitter output signal.

11. A cyclic function modifying circuit comprising, a synchro transmitter generating an electrical signal having a space phase representative of a cyclic mechanical displacement function applied to control the angular displacement of its shaft, a synchro receiving device, a differential synchro including primary and secondary windings, a circuit having said secondary windings connected in series therein interconnecting the output of said synchro transmitter and the input of said synchro receiving device to apply said electrical signal thereto, and adjustable step-down transformer means interconnecting the output of said synchro transmitter and the primary windings of said differential synchro, whereby said electrical signal is reproduced by said differential synchro in the secondary windings thereof at double space frequency and at reduced amplitude to form a correction signal superposed on the electrical signal applied to said synchro receiving device.

12. A cyclic function modifying circuit comprising, a synchro transmitter, a synchro receiving device, a circuit connecting the output of said synchro transmitter to the input of said synchro receiving device, impedance means connected in shunt with the output of said synchro transmitter for securing therefrom a fraction of the voltage thereof, and a differential synchro having its primary windings connected to said impedance means for energization by said fractional voltage and having its secondary windings connected in series in said circuit whereby said secondary windings are in series with the input of said synchro receiving device.

References Cited in the file of this patent
UNITED STATES PATENTS
2,455,364    Hays ------------------ Dec. 7, 1948